(12) United States Patent
Li et al.

(10) Patent No.: US 10,789,359 B2
(45) Date of Patent: Sep. 29, 2020

(54) METHOD, APPARATUS AND STORAGE MEDIUM FOR DEFENDING AGAINST MALICIOUS CLICKS

(71) Applicant: Baidu Online Network Technology (Beijing) Co., Ltd., Beijing (CN)

(72) Inventors: Xiaogang Li, Beijing (CN); Qing Huo, Beijing (CN); Jie Zhou, Beijing (CN); Le Guo, Beijing (CN); Yunlong Li, Beijing (CN); Junjia Lu, Beijing (CN)

(73) Assignee: BAIDU ONLINE NETWORK TECHNOLOGY (BEJING) CO., LTD., Beijing (CN)

( * ) Notice: Subject to any disclaimer, the term of this patent is extended or adjusted under 35 U.S.C. 154(b) by 45 days.

(21) Appl. No.: 15/119,675

(22) PCT Filed: Nov. 3, 2015

(86) PCT No.: PCT/CN2015/093623
§ 371 (c)(1),
(2) Date: Aug. 17, 2016

(87) PCT Pub. No.: WO2016/119499
PCT Pub. Date: Aug. 4, 2016

(65) Prior Publication Data
US 2017/0323100 A1    Nov. 9, 2017

(30) Foreign Application Priority Data
Jan. 26, 2015 (CN) .......................... 2015 1 0038602

(51) Int. Cl.
*G06F 21/56* (2013.01)
*G06Q 30/02* (2012.01)
*H04L 29/06* (2006.01)

(52) U.S. Cl.
CPC ......... *G06F 21/56* (2013.01); *G06Q 30/0248* (2013.01); *G06Q 30/0277* (2013.01); *H04L 29/06* (2013.01)

(58) Field of Classification Search
CPC .......................... G06F 21/56; G06Q 30/0277
See application file for complete search history.

(56) References Cited

U.S. PATENT DOCUMENTS

| 7,657,626 B1 * | 2/2010 | Zwicky | G06Q 30/02 |
| | | | 705/51 |
| 8,996,404 B2 | 3/2015 | Ha et al. | |

(Continued)

FOREIGN PATENT DOCUMENTS

| CN | 101681470 A | 3/2010 |
| CN | 101882278 A | 11/2010 |

(Continued)

OTHER PUBLICATIONS

International Search Report for Application No. PCT/CN2015/093623 dated Jan. 29, 2016, in 4 pages.

*Primary Examiner* — Jahangir Kabir
(74) *Attorney, Agent, or Firm* — Knobbe Martens Olson & Bear LLP

(57) ABSTRACT

The present invention discloses a method, apparatus and a storage medium for defending against malicious clicks. The method includes: acquiring a shielding policy corresponding to promotional content; determining a user in a shielding policy list as the user to be shielded based on the shielding policy and historical click information of users; and performing shielding processing on the promotional content for the user to be shielded, if the user to be shielded in the shielding policy list conducts a retrieval. According to the technical solution provided by the embodiments of the present invention, malicious clicks are prevented at the stage of displaying promotional content in a front end of a server.

5 Claims, 4 Drawing Sheets

(56) References Cited

U.S. PATENT DOCUMENTS

| | | | |
|---|---|---|---|
| 9,027,136 B2* | 5/2015 | Be'ery | H04L 63/1408 |
| | | | 726/23 |
| 2007/0255821 A1 | 11/2007 | Ge | |
| 2008/0147456 A1 | 6/2008 | Broder et al. | |
| 2009/0125719 A1* | 5/2009 | Cochran | G06Q 30/02 |
| | | | 713/171 |
| 2010/0131353 A1* | 5/2010 | Ha | G06Q 30/02 |
| | | | 705/14.42 |
| 2012/0278142 A1* | 11/2012 | Li | G06Q 30/02 |
| | | | 705/14.1 |
| 2013/0227598 A1* | 8/2013 | Srinivasan | H04N 21/44213 |
| | | | 725/14 |
| 2014/0149208 A1 | 5/2014 | Zwicky | |
| 2014/0172552 A1* | 6/2014 | Raab | G06Q 30/0248 |
| | | | 705/14.47 |

FOREIGN PATENT DOCUMENTS

| | | |
|---|---|---|
| CN | 102136115 A | 7/2011 |
| CN | 103870572 A | 6/2014 |
| CN | 104580244 A | 4/2015 |
| JP | 2004-30115 | 1/2004 |
| JP | 2007286803 A | 11/2007 |
| JP | 2009230524 A | 10/2009 |
| JP | 2013-9058 | 1/2013 |

* cited by examiner

METHOD, APPARATUS AND STORAGE MEDIUM FOR DEFENDING AGAINST MALICIOUS CLICKS

This patent application claims the priority to Chinese Patent Application No. 201510038602.0, entitled "METHOD AND APPARATUS FOR DEFENDING AGAINST MALICIOUS CLICKS," filed on Jan. 26, 2015 by Baidu Online Network Technology (Beijing) Co., Ltd., which is incorporated herein by reference in its entirety.

TECHNICAL FIELD

Embodiments of the present invention relate to network information security technologies, and specifically to a method, apparatus and storage medium for defending against malicious clicks.

BACKGROUND

With the rise of the Internet advertisement and marketing promotion, increasingly more Internet companies have started online promotional services. There are numerous means for the Internet companies to charge businesses for the online promotional services, including view-based pay, click-based pay and result-based pay, and the click-based pay is currently the most popular and widely used. However, the click-based pay has problems of false or intentional malicious clicks driven by various motives. As a result, the business' promotional costs may increase sharply. At the same time, the advertisement publisher, in particular, an alliance member of the advertisement publishers, reaps additional profits.

A typical situation is a business pays for the opportunities to display promotional content at a search website, and when Internet users click the promotional content, the search website charges the business according to the number of clicks. Due to market competition, a competitor of the business, or an Internet user with a malicious intent towards the business, may on his own or cause others to search and click the business's promotional content. If there is no effective prevention mechanism, the business's promotional costs will increase sharply and the business's customer service and consultation resources will be occupied.

A current widely adopted conventional method for defending against malicious clicks is to judge click activities and parameters at the back end of a server, to determine whether or not malicious clicks have occurred, and then to process the detected malicious clicks as no charge in a click log.

This conventional method has some major shortcomings: (1) after-the-fact, the back-end filtering can only deal with malicious clicks that have occurred by reversibly non-charging or refunding the business, and cannot prevent them at their sources; and (2) poor timeliness, when the malicious clicks occur, this method cannot quickly respond to prevent the clicks in real time, such that these malicious activities will occupy the business's promotion and customer service resources.

SUMMARY OF THE INVENTION

The embodiments of the present invention provide a method, apparatus and storage medium for defending against malicious clicks, to timely prevent malicious clicks on promotional content.

In a first aspect, the embodiments of the present invention provide a method for defending against malicious clicks, including:

acquiring a shielding policy corresponding to promotional content;

determining a user in a shielding policy list as the user to be shielded based on the shielding policy and historical click information of users; and if the user to be shielded in the shielding policy list conducts a retrieval, performing shielding processing on the promotional content for the user to be shielded.

In a second aspect, the embodiments of the present invention provide an apparatus for defending against malicious clicks, including:

a service module, wherein the service module includes a shielding policy acquisition unit, which is configured to acquire a shielding policy corresponding to promotional content;

an anti-fraudulence module, wherein the anti-fraudulence module includes a shielded user determination unit, which is configured to determine a user in a shielding policy list as the user to be shielded based on the shielding policy and historical click information of users; and a retrieval shielding module, which is configured to perform shielding processing on the promotional content for the user to be shielded if the user to be shielded in the shielding policy list conducts a retrieval.

In a third aspect, the embodiments of the present invention provide a non-volatile computer storage medium, the non-volatile computer storage medium storing one or more modules, wherein when the one or more modules are executed by an apparatus that performs methods for defending against malicious clicks, the apparatus is activated to perform the following operations of:

acquiring a shielding policy corresponding to promotional content;

determining a user in the shielding policy list as the user to be shielded based on the shielding policy and historical click information of users; and if the user to be shielded in the shielding policy list conducts a retrieval, performing shielding processing on the promotional content for the user to be shielded.

According to the technical solutions provided by the embodiments of the present invention, malicious clicks are prevented at the stage of displaying promotional content in a front end of a server. On one hand, it is possible to determine malicious clicks based on real-time click information and provide a timely and effective defense, improving the timeliness of the defense; on the other hand, the shielding policy may be set by the business users, enhancing the independence of the business users in preventing malicious clicks.

BRIEF DESCRIPTION OF THE DRAWINGS

In order to describe the technical solution provided in the embodiments of the present invention more clearly, the accompanying drawings referred to in the description of the embodiments are briefly described below. Naturally, the accompanying drawings in the following description are merely embodiments of the present invention, and those of ordinary skill in the art may also modify and replace the accompanying drawings without making creative efforts.

DETAILED DESCRIPTION

The technical solution in the embodiments of the present invention will be clearly and completely described below with reference to the accompanying drawings. It is apparent that the embodiments to be described are only a part rather than all of the embodiments of the present invention, and are intended to describe the principle of the present invention instead of limiting the present invention to the specific embodiments. All other embodiments derived by those of ordinary skill in the art based on the embodiments of the present invention without making creative efforts will fall within the protection scope of the present invention.

First Embodiment

Figure 1:
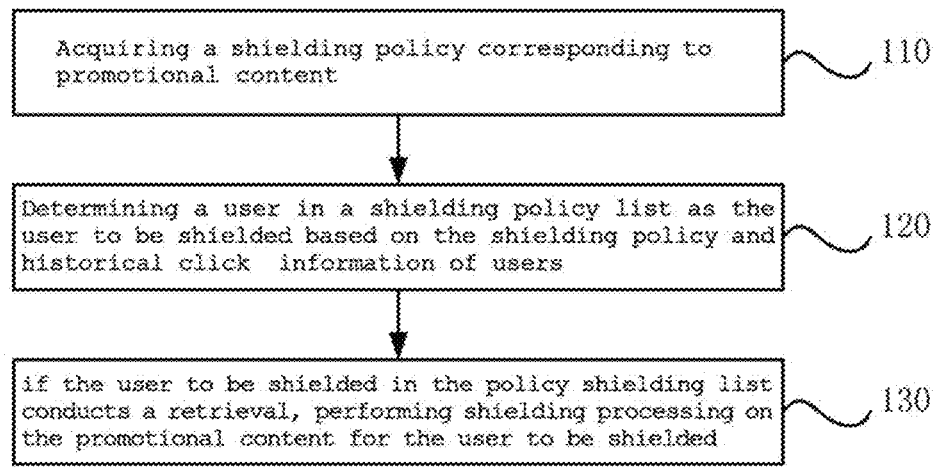
FIG. 1 is a flow chart of a method for defending against malicious clicks according to a first embodiment of the present invention.
Figure 2:
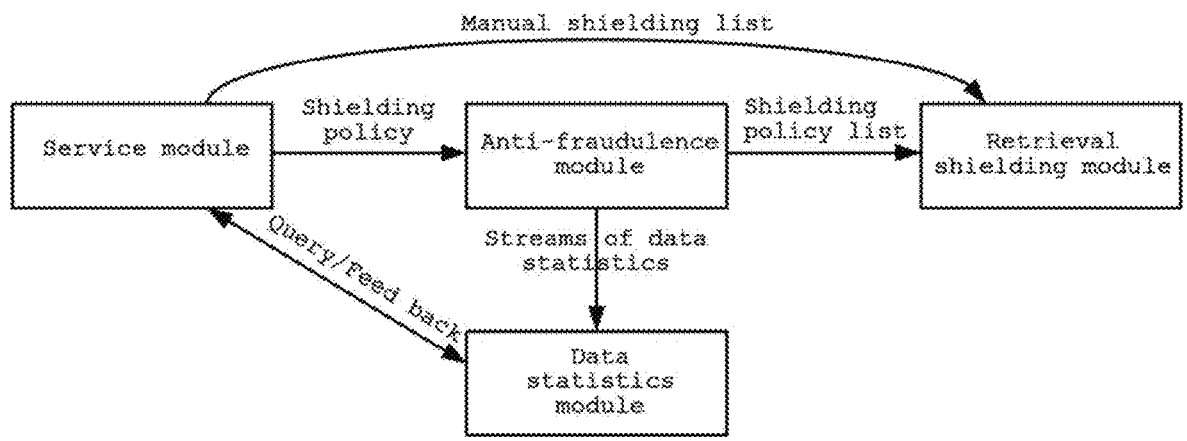
FIG. 2 is a schematic structural diagram of an apparatus for defending against malicious clicks applicable to the embodiments of the present invention.

FIG. 1 is a flow chart of a method for defending against malicious clicks according to a first embodiment of the present invention, which method may be performed by an apparatus for defending against malicious clicks implemented by means of hardware and/or software. Generally, the apparatus is configured in a server that provides search services in order to defend against malicious click activities in real time. FIG. 2 is a schematic structural diagram of an apparatus for defending against malicious clicks applicable to the embodiments of the present invention. A preferred architecture of the apparatus includes a service module, an anti-fraudulence module, a retrieval shielding module and a data statistics module. The method will be described below in combination with the architecture of the apparatus. However, those skilled in the art should understand that apparatuses that may perform the defending method according to the embodiment of the present invention should not be limited to the present one employing the architecture as described herein.

The method for defending against malicious clicks according to the embodiment includes the following.

S110, acquiring a shielding policy corresponding to promotional content.

This operation may be implemented by the service module, which provides an interface for a business user who sets up the promotional content, and may acquire a shielding policy independently set by the business user. The business user may set a uniform shielding policy for all of the promotional content, or different shielding policies respectively for different promotional content. The business user may flexibly adjust the shielding policy or policies before or during the course of promoting the promotional content.

The shielding policy preferably includes a policy name, an effective range, an effective time, a threshold of the click number and other items. The policy name is configured to distinguish different policies, and is used as a unique identification of a policy. The effective range is configured to clarify whether the shielding policy is effective for all promotional content or only for certain promotional content of the business user. The effective time is configured to determine the time interval of a click condition monitored by the shielding policy, for example, 15 minutes, 1 hour or 6 hours, and different shielding policies may be set up with different time ranges. The business user may set a threshold of the number of clicks according to the past click condition of the promotional content. If the same retrieval user clicks the promotional content within the effective range in the effective time more than the threshold of the number of clicks, the retrieval user hits the shielding policy. The business user generates a shielding policy after setting the above parameters, and the shielding policy may be transmitted to the anti-fraudulence module through data streams, in order to distinguish the identified retrieval user.

S120, determining a user in a shielding policy list as the user to be shielded according to the shielding policy and historical click information of users.

This operation is implemented by the anti-fraudulence module, which processes click data streams on an on-going basis and may acquire historical click information of a retrieval user in real time from the search log of a search engine. The historical click information may include a retrieval user, retrieval time, information including the promotional content and the number of clicks displayed in a retrieval result, and it is mainly configured to enable the anti-fraudulence module to gather statistics on clicking the promotional content by the retrieval user.

It is possible to identify whether a retrieval user satisfies the shielding policy based on the historical click information of the user. The retrieval user that satisfies the shielding policy is the user to be shielded corresponding to the promotional content set by the business user, and may be added into a shielding policy list to form a mapping relationship with the business user or with part of his promotional content. For example of the above preferred shielding policy, the operation of S120 may be specified as follows: according to the historical click information, determining a user in line with the effective range, effective time and threshold of the number of clicks in the shielding policy as the user to be shielded, and adding the user into the shielding policy list. The shielding policy list is transferred to the retrieval shielding module by the anti-fraudulence module in real time and comes into effect immediately.

The user to be shielded may be differentiated by using an IP, an account identification (cookie), a unique visitor identification or the like to recognize the identity, and the user to be shielded may be a single user or a user group such as all users in a certain IP sub-network. The unique visitor identification is a unique user identification that is determined based on various information of the retrieval user as long as the identification may uniquely identify the retrieval user. For example, it may be an identification combining his IP and account information.

S130, shielding the promotional content from the user to be shielded if the user to be shielded in the shielding policy list conducts a retrieval.

This operation may be performed by the retrieval shielding module. The retrieval shielding module is configured to provide retrieval services for each retrieval user. In this embodiment, the retrieval shielding module acquires the shielding policy list from the anti-fraudulence module, treats the retrieval user as the one making malicious clicks when it monitors that a retrieval user is the user to be shielded in the shielding policy list, and performs a shielding process, thus preventing the user making malicious clicks from continuously clicking the promotional content of the business user before the promotional content is displayed.

The operation of performing the shielding processing to shield the promotional content for the user to be shielded preferably includes:

prohibiting displaying the promotional content for the user to be shielded; or exchanging the promotional content with replacement content, and displaying the replacement content to the user to be shielded.

On one hand, performing the shielding processing on the promotional content may directly prohibit displaying the corresponding promotional content. On the other hand, it may also display a substitute solution rather than the promotional content. That is, the shielding processing prohibits the promotional content from being displayed to the retrieval user, and at the same time it searches the replacement content of the promotional content, which may be the promotional content of other business users similar to the current promotional content, or content beneficial to the public, and displays the replacement content to the user to be shielded. This kind of replacement still meets the search needs of Internet users and promotion needs of other business users.

According to the technical solution of the embodiment of the present invention, malicious clicks are prohibited at the front end of the server before the promotional content is displayed. On one hand, it is possible to determine malicious clicks based on the real-time click information and conduct timely and effective defense, thus improving timeliness of the defense. On the other hand, the shielding policy may be set by the business users, thus improving the business users' autonomy on controlling malicious clicks. In addition, the solution considers Internet users' experience as it does not need to take measures such as imposing resource occupation against those Internet users who make malicious clicks. Further by providing the replacement content, this technical solution may also meet the shielding demands of the business user against the Internet users and the promotion demands of other business users that need to display promotional content. Therefore, this solution achieves a tripartite win.

With the rise of the Internet marketing promotion and advertisement, more and more modes of click-based pay are generated, not only on search promotions but also on Internet alliance promotions, video pre-movie adverts, and the like. As long as the payment is click-based, it will encounter malicious click problems, and such problems will directly threaten the foundation of the click-based pay business. Therefore, the new method for defending against malicious clicks according to the embodiment of the present invention may effectively prevent the malicious clicks before they occur, protects the benefits of the businesses and the promotion platforms, and thus enhances the customers' return on investment (ROI), degree of satisfaction and long-term sound development of the promotion platforms.

Second Embodiment

Figure 3:
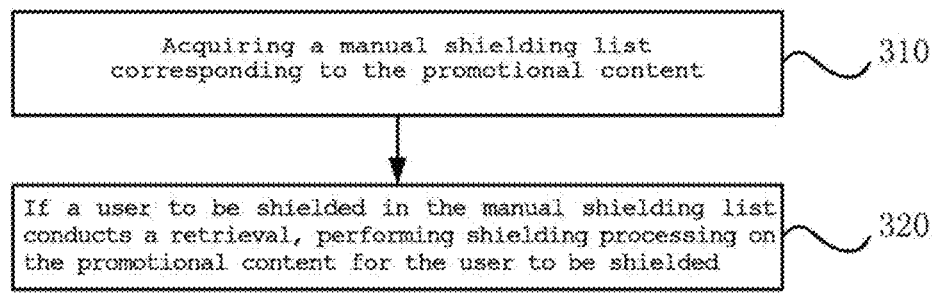
FIG. 3 is a flow chart of a method for defending against malicious clicks according to a second embodiment of the present invention.

FIG. 3 is a flow chart of a method for defending against malicious clicks according to a second embodiment of the present invention. This embodiment makes an optimization and improvement on the above technical solution, and further comprises a technical measure of defending against malicious clicks through a manual shielding list. That is, on the basis of the foregoing embodiment, this embodiment further includes the following steps.

S310, acquiring a manual shielding list corresponding to the promotional content.

The operation of acquiring a manual shielding list may also be performed by the service module. The business user may set a retrieval user as the one to be shielded according to his/her judgment that this retrieval user should be shielded, using an IP, account information (Cookie), a unique visitor identification or the like as the identity recognition of the retrieval user. When the retrieval user is set as the user to be shielded by the business user, the manual shielding list is formed, and the list is directly transmitted to the retrieval shielding module through data streams, and configured to shield the promotional content from the retrieval user. The user to be shielded in the manual shielding list may be effective for all or part of the promotional content of the business user.

S320, performing a shielding processing to shield the promote content for the user to be shielded if a user to be shielded in the manual shielding list conducts a retrieval on the promotional content.

The operation may be performed by the retrieval shielding module, and the operations based on the manual shielding list are similar to that according to the shielding policy list.

The technical solution of this embodiment achieves effects of policy-based shielding and manual shielding. The business user may further manually add a designated Internet user as the user to be shielded, so that the Internet user cannot retrieve the promotional content of the business user.

Third Embodiment

Figure 4:
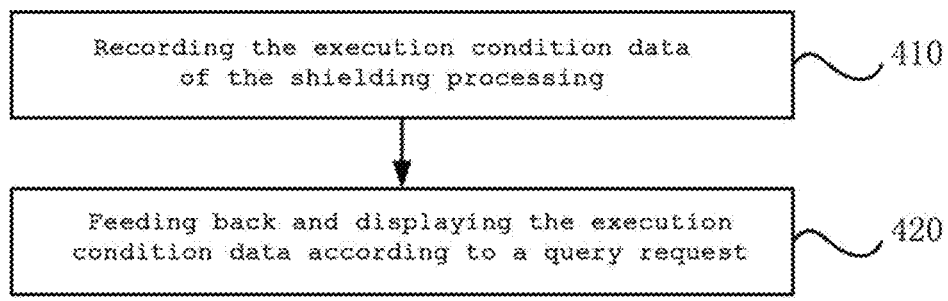
FIG. 4 is a flow chart of a method for defending against malicious clicks according to a third embodiment of the present invention.

FIG. 4 is a flow chart of a method for defending against malicious clicks according to the third embodiment of the present invention. This embodiment further includes a solution of feeding back the execution condition of the shielding processing on the basis of the above embodiments. This embodiment may still be performed by the apparatus for defending against malicious clicks as shown in FIG. 2.

This embodiment further provides the following steps in the method according to the foregoing embodiments:

S410, recording the execution condition data of the shielding process.

This operation may be performed by the anti-fraudulence module, which, while forming the shielding policy list, records the execution condition data of the shielding process, for example, a shielding policy list that records hits according to the shielding policy, the number of times the promotional content is shielded when the user to be shielded conducts a retrieval, and the like.

S420, feeding back and displaying the execution condition data upon a query request.

This operation may be performed by the data statistics module. The data statistics module is an optional module, configured to effectively analyze and store the execution condition data of the shielding processing performed by the anti-fraudulence module and store the data reports obtained after analyzing the data. When the service module receives a query request from the business user, the data statistics module retrieves the statistical information, displays the data to the user with a visual chart, and guides the business user regarding the data disclosure and related configuration.

Based on the technical solution provided by the embodiment of the present invention, after the business user sets a shielding policy or a manual shielding list, the subsequent Internet users' detailed information and statistical data hit by the shielding policy, and the manual shielding list may be viewed through the service module. Upon receipt of a view request from the business user, the service module will initiate a data query request to the data statistics module, the data statistics module then returns a corresponding statistical report to the service module, displays the report information to the business user through a visual chart and facilitates the business user to evaluate the usefulness of the shielding policy.

Fourth Embodiment

Figure 5:
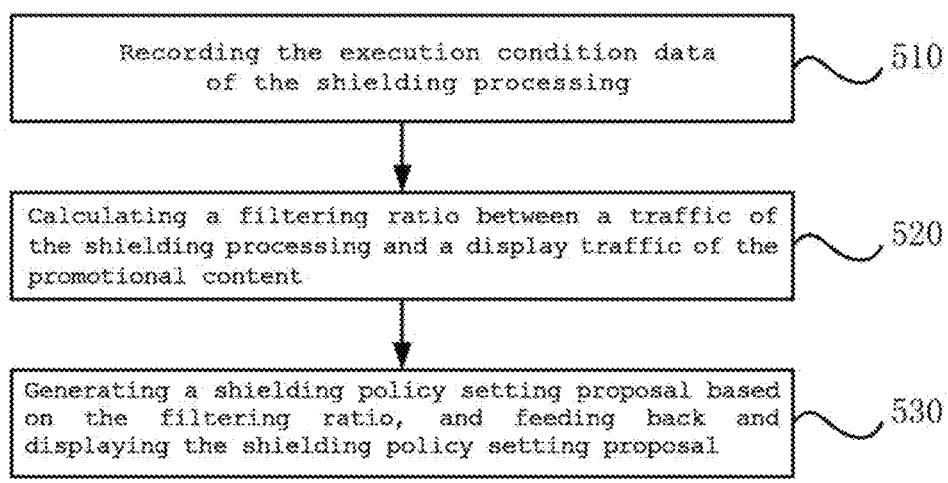
FIG. 5 is a flow chart of a method for defending against malicious clicks according to a fourth embodiment of the present invention.

FIG. 5 is a flow chart of a method for defending against malicious clicks according to a fourth embodiment of the present invention. This embodiment adds a solution of feeding back the execution condition of the shielding processing on the basis of the above embodiments. This embodiment may still be performed by the apparatus for defending against malicious clicks as shown in FIG. 2.

This embodiment further includes the following steps on the basis of the methods according to the foregoing embodiments:

S510, recording the execution condition data of the shielding process; and

S520, calculating a filtering ration between the traffic of the shielding processing and the display traffic of the promotional content.

This operation may be performed by the anti-fraudulence module. For example, according to the execution condition data, it is possible to conduct a strategically and newly shielded Internet user statistics on a daily basis, which data is imported into the data statistics module for query by the service module. The daily strategically and newly shielded Internet user statistics means that, on a daily basis, the occurrences that the promotional content is shielded from a retrieval user are recorded as the traffic of the shielding process, the occurrences that the promotional content are displayed on the same date is recorded as the display traffic, and a ratio between the two traffics is calculated as the filtering ratio. The statistical information on the daily filtering ratio may be transmitted to the data statistics module through data streams for processing by the subsequent module.

S530, generating, feeding back and displaying a shielding policy setting proposal based on the filtering ratio.

The data statistics module may generate a proposal according to the filtering ratio. For example, when the filtering ratio is greater, it indicates that most promotional content is shielded from being displayed and the setting of the shielding policy may be too strict, and it may propose to increase the identification threshold for malicious clicks and reduce the number of users to be shielded. This proposal may be transmitted to the service module from the data statistics module, as a feed back to the business user.

The technical solution of this embodiment can provide more data support for the business user to configure the shielding policies, resulting in a better match between the setting of the shielding policy and the defense against the malicious clicks.

The two solutions that the anti-fraudulence module cooperates with the data statistics module for recording and feedback respectively provided in the third and fourth embodiments may be adopted separately, but preferentially adopted jointly.

Fifth Embodiment

Figure 6:
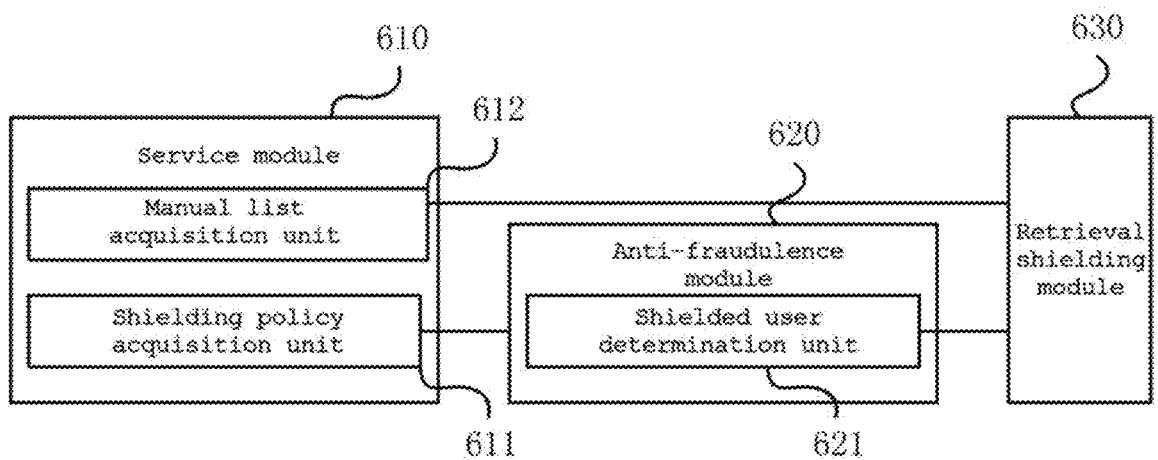
FIG. 6 is a schematic structural diagram of an apparatus for defending against malicious clicks according to a fifth embodiment of the present invention.

FIG. 6 is a schematic structural diagram of an apparatus for defending against malicious clicks according to a fifth embodiment of the present invention. The apparatus includes a service module 610, an anti-fraudulence module 620 and a retrieval shielding module 630.

The service module 610 includes a shielding policy acquisition unit 611, configured to acquire a shielding policy corresponding to the promotional content. The anti-fraudulence module 620 includes a shielded user determination unit 621, configured to determine a user in a shielding policy list as the user to be shielded according to the shielding policy and historical click information of users. The retrieval shielding module 630 is configured to perform a shielding processing to shield the promotional content for the user to be shielded if the user to be shielded in the shielding policy list conducts a retrieval In the above apparatus, the shielded user determination unit 621 may be specifically configured to determine a user satisfying the effective range, effective time and threshold of the number of clicks in the shielding policy as the user to be shielded, and add the user to the shielding policy list, according to the historical click information.

Preferably, the service module 610 further includes a manual list acquisition unit 612, configured to acquire a manual shielding list corresponding to the promotional content; and the retrieval shielding module 630 is further configured to perform shielding processing on the promotional content for the user to be shielded if the user to be shielded in the manual shielding list conducts a retrieval.

An identification of the user to be shielded in the above shielding policy list and the manual shielding list may be an IP, an account identification or a unique visitor identification.

In the above solution, the retrieval shielding module 630 is preferably and specifically configured to:
prohibit displaying the promotional content to the user to be shielded; or
exchange the promotional content with replacement content, and display the replacement content to the user to be shielded.

Sixth Embodiment

Figure 7:
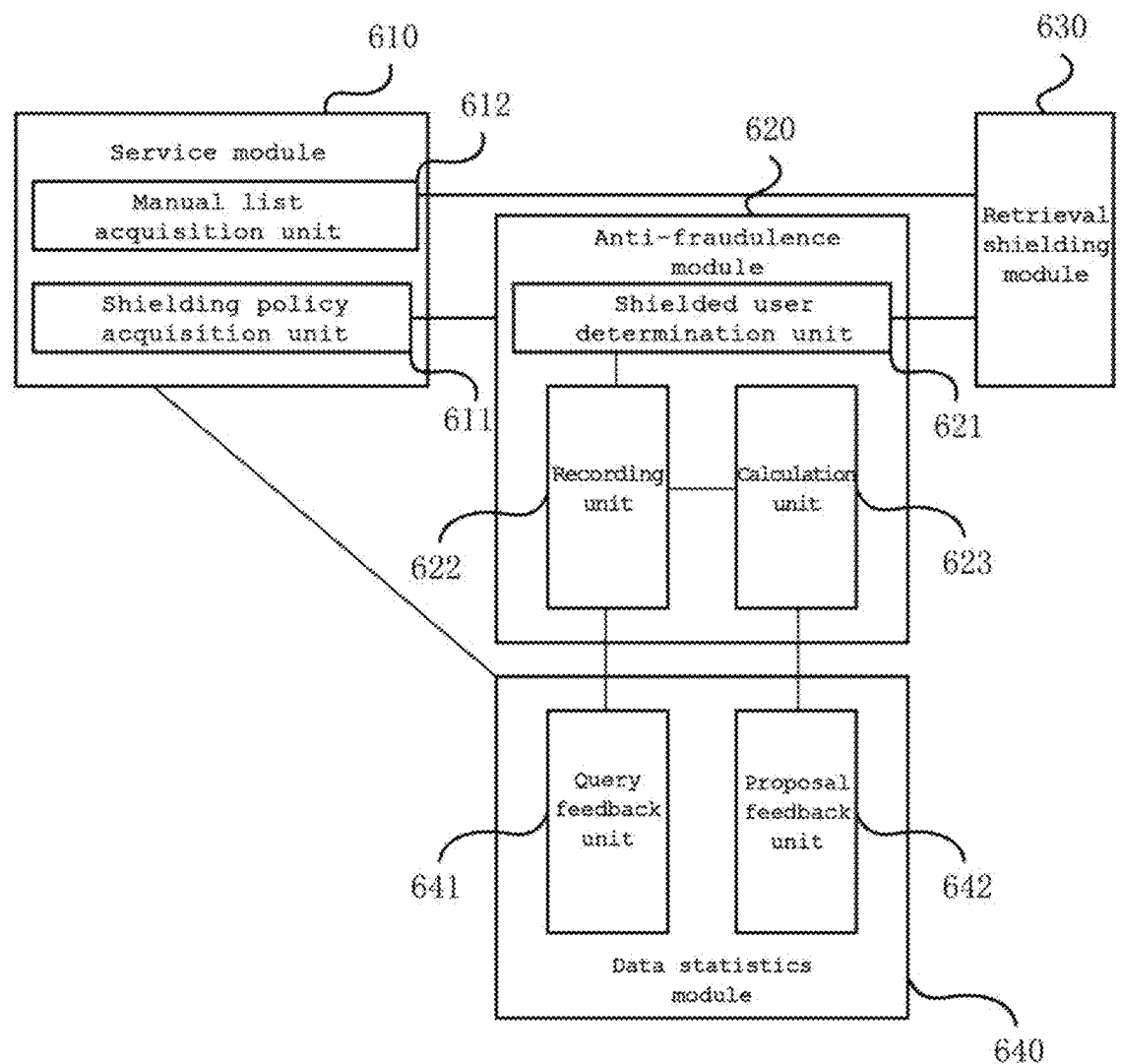
FIG. 7 is a schematic structural diagram of an apparatus for defending against malicious clicks according to a sixth embodiment of the present invention.

FIG. 7 is a schematic structural diagram of an apparatus for defending against malicious clicks according to a sixth embodiment of the present invention. In this embodiment, a data statistics module 640 is further included on the basis of the foregoing embodiments.

Specifically, the anti-fraudulence module 620 further includes a recording unit 622, configured to record the execution condition data of the shielding process. The apparatus further includes a data statistics module 640, which includes a query feedback unit 641 configured to feed back and display the execution condition data according to a query request.

Alternatively, the anti-fraudulence module 620 further includes a recording unit 622 configured to record the execution condition data of the shielding process, and a calculation unit 623 configured to calculate a filtering ratio between a traffic of the shielding processing and a display traffic of the promotional content. The apparatus further includes a data statistics module 640, which includes a proposal feedback unit 642 configured to generate a shielding policy setting proposal according to the filtering ratio, and feed back and display the shielding policy setting proposal.

The two solutions that the anti-fraudulence module cooperates with the data statistics module for recording and feedback may be adopted separately, and it is preferred to adopt them jointly.

The above apparatus may perform the methods for defending against malicious clicks according to any embodiment of the present invention, has the corresponding functional modules that perform the methods and achieves beneficial effects.

Seventh Embodiment

This embodiment provides a non-volatile computer storage medium, the non-volatile computer storage medium storing one or more modules, wherein, when the one or more modules are executed by an apparatus that performs the method for defending against malicious clicks, the apparatus is activated to perform the following operations of:

acquiring a shielding policy corresponding to the promotional content;

determining a user in a shielding policy list as the user to be shielded based on the shielding policy and historical click information of users; and if the user to be shielded in the shielding policy list conducts a retrieval, performing shielding processing on the promotional content for the user to be shielded.

When the modules stored in the storage medium are executed by the apparatus, the operation of determining a user in a shielding policy list as the user to be shielded based on the shielding policy and historical click information of users may include:

determining a user who satisfies the effective range, effective time and threshold of the number of clicks in the shielding policy as the user to be shielded based on the historical click information, and adding the user to the shielding policy list.

When the modules stored in the storage medium are executed by the apparatus, the following operations may be further included:

acquiring a manual shielding list corresponding to the promotional content; and performing shielding processing on the promotional content for the user to be shielded if the user to be shielded in the manual shielding list conducts a retrieval.

When the modules stored in the storage medium are executed by the apparatus, the identification of the user to be shielded may be an IP, an account identification or a unique visitor identification.

When the modules stored in the storage medium are executed by the apparatus, the performing shielding processing on the promotional content for the user to be shielded may include:

prohibiting displaying the promotional content to the user to be shielded; or exchanging the promotional content with replacement content, and displaying the replacement content to the user to be shielded.

When the modules stored in the storage medium are executed by the apparatus, the following operations may be further included:

recording the execution condition data of the shielding processing; and feeding back and displaying the execution condition data according to a query request.

When the modules stored in the storage medium are executed by the apparatus, the following operations may be further included:

recording the execution condition data of the shielding processing;

calculating a filtering ratio between a traffic of the shielding processing and a display traffic of the promotional content; and generating shielding policy setting proposal based on the filtering ratio, and feeding back and displaying the shielding policy setting proposal.

Eighth Embodiment

Figure 8:
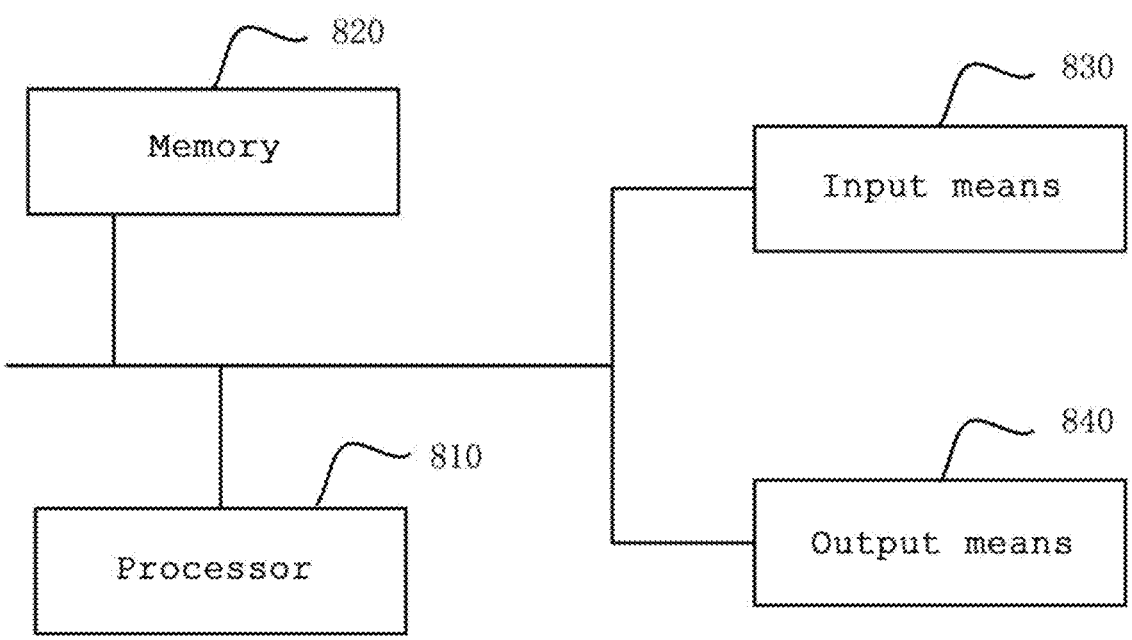
FIG. 8 is a schematic diagram of a hardware structure of a device that performs the method for defending against malicious clicks according to an eighth embodiment of the present invention.

FIG. 8 is a schematic diagram of a hardware structure of an apparatus that performs a method for defending against malicious clicks according to an eighth embodiment of the present invention.

Referring to FIG. 8, the apparatus includes:

one or more processors 810, wherein a processor 810 is illustrated as an example in FIG. 8;

a memory 820; and one or more modules.

The apparatus may further include an input means 830 and an output means 840. The processor 810, the memory 820, the input means 830 and the output means 840 of the apparatus may be connected through a bus or by other ways, and FIG. 6 shows that they are connected through a bus as an example.

The memory 820 is, as a computer readable storage medium, configured to store software programs, computer executable programs and modules such as the program instructions/modules corresponding to the methods for defending against malicious clicks in the embodiments of the present invention, for example, the modules may be the service module 610, the anti-fraudulence module 620 and the retrieval shielding module 630 in the apparatus for defending against malicious clicks as shown in FIG. 6. The processor 810 executes every functional application and data processing of a server by running software programs, instructions and modules stored in the memory 820, so as to implement the methods for defending against malicious clicks in the above method embodiments.

The memory 820 may include a program storage area and a data storage area, wherein the program storage area stores an operating system and an application program required by at least one function, and the data storage area may store data or the like created based on the use of a terminal device. In addition, the memory 820 may include a high-speed random access memory, and may further include non-volatile memories, such as at least one disk storage device, a flash memory device, or other non-volatile solid-state storage means. In some examples, the memory 820 may further include memories remotely disposed relative to the processor 810, and the remote memories may be connected to a terminal device via a network. Examples of the networks include, but not limited to, the Internet, an enterprise intranet, a local area network, a mobile communication network and a combination thereof.

The input means 830 may be configured to receive input digital or character information, and generate key signal input related to user settings and function controls of the terminal. The output means 840 may include a display screen and other display devices.

The one or more modules are stored in the memory 820, and when being executed by the one or more processors 810, the one or more modules perform the following operations of:

acquiring a shielding policy corresponding to the promotional content;

determining a user in a shielding policy list as the user to be shielded based on the shielding policy and historical click information of users; and if the user to be shielded in the shielding policy list conducts a retrieval, performing shielding processing on the promotional content for the user to be shielded.

Further, the determining a user in a shielding policy list as the user to be shielded based on the shielding policy and historical click information of users may include:

determining a user who satisfies the effective range, effective time and threshold of the number of clicks in the shielding policy as the user to be shielded based on the historical click information, and adding the user to the shielding policy list.

Further, the following operations may be further included:

acquiring a manual shielding list corresponding to the promotional content; and if a user to be shielded in the manual shielding list conducts a retrieval, performing shielding processing on the promotional content for the user to be shielded.

Further, an identification of the user to be shielded may be an IP, an account identification or a unique visitor identification.

Further, the performing shielding processing on the promotional content for the user to be shielded may include:

prohibiting displaying the promotional content to the user to be shielded; or exchanging the promotional content with replacement content, and displaying the replacement content to the user to be shielded.

Further, the following operations may be further included:

recording the execution condition data of the shielding process; and feeding back and displaying the execution condition data based on a query request.

Further, the following operations may be further included:

recording the execution condition data of the shielding process;

calculating a filtering ratio between a traffic of the shielding processing and a display traffic of the promotional content; and generating a shielding policy setting proposal based on the filtering ratio, and feeding back and displaying the shielding policy setting proposal.

Through the above description on embodiments, those skilled in the art should appreciate that the present invention may be accomplished through software and necessary generic hardware or be accomplished through hardware, but the former may be a better implementation under many circumstances. Based on such understanding, the technical solutions of the present invention or the contributing part to the prior art may be embodied in the form of software products. The computer software products may be stored in a computer readable storage medium such as a floppy disk of a computer, a Read-Only Memory (ROM), a Random Access Memory (RAM), a flash memory, a hard disk or an optical disk, and contain several instructions configured to cause a computer device (which may be a personal computer, a server, a network device or the like) to perform the methods according to each of the embodiments of the present invention.

It should be noted that, in the above embodiments of the apparatus for defending against malicious clicks, each unit and module included therein are merely divided based on their functional logic, but are not limited to the above division as long as the unit and module may achieve the corresponding functions. In addition, the specific name of each functional unit is only intended to facilitate distinction of the units, and should not be used to limit the protection scope of the present invention.

The above description describes merely specific embodiments of the present invention. The protection scope of the present invention should not be limited to these embodiments. All variations or replacements, within the technical scope disclosed in the present invention, which may be easily envisioned by any person skilled in the art, should be covered in the protection scope of the present invention. Therefore, the protection scope of the present invention should be defined by the claims.

What is claimed is:

1. A method to defend against malicious clicks, comprising:

acquiring a shielding policy combination corresponding to a plurality of pieces of promotional content set up by a first business user, comprising providing an interface for an advertiser to set the shielding policy combination, the shielding policy combination comprising a uniform shielding policy for all pieces of the promotional content; a differential shielding policy specified for each piece of the promotional content; different shielding policies for a given piece of the promotional content, the different shielding policies for the given piece being configured to monitor a click condition of the given piece during different time ranges; and a manual shielding list including an IP address, and an account identification, wherein the first business user is charged for a click on the pieces of promotional content;

determining a user as the user to be shielded according to shielding policies and historical click information of the user, wherein the user to be shielded comprises all users in an IP sub-network;

determining that the user to be shielded conducts a retrieval of the promotional content based on an IP address and an account identification of the user to be shielded;

performing shielding processing on the promotional content for the user to be shielded in response to the user to be shielded conducting the retrieval of the promotional content set up by the first business user, the shielding processing comprising prohibiting the promotional content from being displayed to the user to be shielded and displaying a replacement promotional content set up by a second business user other than the first business user to the user to be shielded;

recording an execution condition data of the shielding processing;

analyzing the execution condition data of the shielding processing and storing a data report obtained after analyzing the data;

displaying the data report with a visual chart, and detailed information of the shielded user to the advertiser upon a query request;

calculating a filtering ratio between a traffic of the shielding processing and a display traffic of the promotional content;

generating a shielding policy amendment proposal based on the filtering ratio, the shielding policy amendment proposal comprising relaxing the shielding policy when the filtering ratio is higher than a preset ratio; and displaying the shielding policy amendment proposal to the advertiser.

2. The method according to claim 1, wherein the determining the user as the user to be shielded according to the shielding policies and the historical click information of the user, and the IP address, the account identification, and the unique visitor identification of the user comprises:

determining, based on the historical click information, the user satisfying an effective range, effective time, and a threshold of a number of clicks in the shielding policies as the user to be shielded, and determining the user satisfying the IP address, the account identification, or the unique visitor identification in the manual shielding list as the user to be shielded.

3. An apparatus for defending against malicious clicks, comprising:

at least one processor; and a memory storing instructions, the instructions when executed by the at least one processor, cause the at least one processor to perform operations, the operations comprising:

acquiring a shielding policy combination corresponding to a plurality of pieces of promotional content set up by a first business user, comprising providing an interface for an advertiser to set the shielding policy combination, the shielding policy combination comprising a uniform shielding policy for all pieces of the promotional content; a differential shielding policy specified for each piece of the promotional content; different shielding policies for a given piece of the promotional content, the different shielding policies for the given piece being configured to monitor a click condition of the given piece during different time ranges; and a manual shielding list including an IP address, and an account identification, wherein the first business user is charged for a click on the pieces of promotional content;

determining a user as the user to be shielded according to shielding policies and historical click information of the user, wherein the user to be shielded comprises all users in an IP sub-network;

determining that the user to be shielded conducts a retrieval of the promotional content based on an IP address and an account identification of the user to be shielded;

performing shielding processing on the promotional content for the user to be shielded in response to the user to be shielded conducting the retrieval of the promotional content set up by the first business user, the shielding processing comprising prohibiting the promotional content from being displayed to the user to be shielded and displaying a replacement promotional content set up by a second business user other than the first business user to the user to be shielded;

recording an execution condition data of the shielding processing;

analyzing the execution condition data of the shielding processing and storing a data report obtained after analyzing the data;

displaying the data report with a visual chart, and detailed information of the shielded user to the advertiser upon a query request;

calculating a filtering ratio between a traffic of the shielding processing and a display traffic of the promotional content;

generating a shielding policy amendment proposal based on the filtering ratio, the shielding policy amendment proposal comprising relaxing the shielding policy when the filtering ratio is higher than a preset ratio; and displaying the shielding policy amendment proposal to the advertiser.

4. The apparatus according to claim 3, wherein the determining the user as the user to be shielded according to the shielding policies and the historical click information of the user, and the IP address, the account identification, and the unique visitor identification of the user comprises:

determining, based on the historical click information, a user satisfying an effective range, effective time, and a threshold of a number of clicks in the shielding policies as the user to be shielded, and determining the user satisfying the IP address, the account identification, or the unique visitor identification in the manual shielding list as the user to be shielded.

5. A non-transitory computer-readable storage medium storing a plurality of instructions that, when executed by an apparatus for defending against malicious clicks, causes the apparatus to perform the method of:

acquiring a shielding policy combination corresponding to a plurality of pieces of promotional content set up by a first business user, comprising providing an interface for an advertiser to set the shielding policy combination, the shielding policy combination comprising a uniform shielding policy for all pieces of the promotional content; a differential shielding policy specified for each piece of the promotional content; different shielding policies for a given piece of the promotional content, the different shielding policies for the given piece being configured to monitor a click condition of the given piece during different time ranges; and a manual shielding list including an IP address, and an account identification, wherein the first business user is charged for a click on the pieces of promotional content;

determining a user as the user to be shielded according to shielding policies and historical click information of the user, wherein the user to be shielded comprises all users in an IP sub-network;

determining that the user to be shielded conducts a retrieval of the promotional content based on an IP address and an account identification of the user to be shielded;

performing shielding processing on the promotional content for the user to be shielded in response to the user to be shielded conducting the retrieval of the promotional content set up by the first business user, the shielding processing comprising prohibiting the promotional content from being displayed to the user to be shielded and displaying a replacement promotional content set up by a second business user other than the first business user to the user to be shielded;

recording an execution condition data of the shielding processing;

analyzing the execution condition data of the shielding processing and storing a data report obtained after analyzing the data;

displaying the data report with a visual chart, and detailed information of the shielded user to the advertiser upon a query request;

calculating a filtering ratio between a traffic of the shielding processing and a display traffic of the promotional content;

generating a shielding policy amendment proposal based on the filtering ratio, the shielding policy amendment proposal comprising relaxing the shielding policy when the filtering ratio is higher than a preset ratio; and displaying the shielding policy amendment proposal to the advertiser.

\* \* \* \* \*